(12) United States Patent
Honda

(10) Patent No.: US 8,749,819 B2
(45) Date of Patent: Jun. 10, 2014

(54) INFORMATION PROCESSING FOR CONTROLLING A PRINTER

(75) Inventor: Hideki Honda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 12/703,127

(22) Filed: Feb. 9, 2010

(65) Prior Publication Data

US 2010/0220354 A1    Sep. 2, 2010

(30) Foreign Application Priority Data

Feb. 27, 2009    (JP) ................................. 2009-047020

(51) Int. Cl.
*G06F 3/12* (2006.01)

(52) U.S. Cl.
USPC .......................................... 358/1.15; 358/1.13

(58) Field of Classification Search
CPC ... G06F 3/1274; G06F 3/1259; G06F 3/1293; H04N 2201/3215; H04L 43/065; H04L 43/062; H04L 43/067
USPC ...................... 358/1.15, 1.14, 1.13
See application file for complete search history.

(56) References Cited

U.S. PATENT DOCUMENTS

| 7,158,243 | B2 |   | 1/2007 | Sakamoto |
| 7,324,220 | B1 | * | 1/2008 | Cheatham et al. ........... 358/1.13 |
| 7,423,772 | B2 |   | 9/2008 | Honda et al. |
| 2007/0005845 | A1 | * | 1/2007 | Abe ................................. 710/62 |
| 2009/0077278 | A1 | * | 3/2009 | Kuroda ........................... 710/58 |

FOREIGN PATENT DOCUMENTS

| JP | 63-71722 A | 4/1988 |
| JP | 2002-200825 A | 7/2002 |
| JP | 2007-328574 A | 12/2007 |
| JP | 2007328574 A * | 12/2007 |

OTHER PUBLICATIONS

Japanese Office Action dated Mar. 25, 2013 issued in corresponding Japanese Patent Application No. 2009-047020.

* cited by examiner

*Primary Examiner* — Jacky X Zheng
(74) *Attorney, Agent, or Firm* — Fitzpatrick, Cella, Harper & Scinto

(57) ABSTRACT

Upon receiving a job-end event from a printer, a data transfer unit executes job-end processing for completing processing relating to a print job. A communication control unit monitors the processing status of the data transfer unit notifies the job management unit of end of the print job after it has been determined, as a result of monitoring, that the job-end processing has been completed.

6 Claims, 9 Drawing Sheets

FIG. 7

```
<wprt:JobEndStateEvent>
 <wprt:JobEndState>
  <wprt:JobId>5</wprt:JobId>
  <wprt:JobCompletedState>Completed</wprt:JobCompletedState>
  <wprt:JobCompletedStateReasons>
   <wprt:JobStateReason>None</wprt:JobStateReason>
  </wprt:JobCompletedStateReasons>
  <wprt:JobName>Full page photo</wprt:JobName>
  <wprt:JobOriginatingUserName>honda</wprt:JobOroginatingUserName>
  <wprt:KOctetsProcessed>3927</wprt:KOctetsProcessed>
  <wprt:MediaSheetsCompleted>0</wprt:MediaSheetsCompleted>
  <wprt:NumberOfDocuments>1</wprt:NumberOfDocuments>
 </wprt:JobEndState>
</wprt:JobEndStateEvent>
```

```
<wprt:JobEndStateEvent>
 <wprt:JobEndState>
  <wprt:JobId>5</wprt:JobId>
  <wprt:JobCompletedState>Canceled</wprt:JobCompletedState>
  <wprt:JobCompletedStateReasons>
   <wprt:JobStateReason>JobCanceledAtDevice</wprt:JobStateReason>
  </wprt:JobCompletedStateReasons>
  <wprt:JobName>Full page photo</wprt:JobName>
  <wprt:JobOriginatingUserName>honda</wprt:JobOroginatingUserName>
  <wprt:KOctetsProcessed>3927</wprt:KOctetsProcessed>
  <wprt:MediaSheetsCompleted>0</wprt:MediaSheetsCompleted>
  <wprt:NumberOfDocuments>1</wprt:NumberOfDocuments>
 </wprt:JobEndState>
</wprt:JobEndStateEvent>
```

801  802

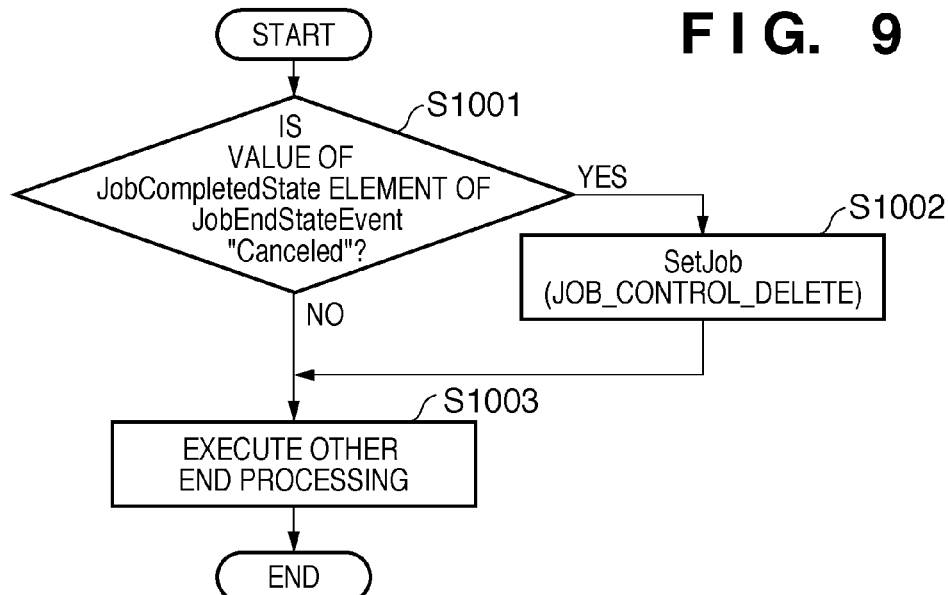

```
<wprt:GetActiveJobsResponse>
 <wprt:ActiveJobs>
  <wprt:JobSummary>
   <wprt:JobId>1</wprt:JobId>
   <wprt:JobState>Completed</wprt:JobState>   ~1001
   <wprt:JobStateReasons>
    <wprt:JobStateReason>JobPrinting</wprt:JobStateReason>
   </wprt:JobStateReasons>
   <wprt:JobName>SampleJob 1</wprt:JobName>
   <wprt:JobOriginatingUserName>Joe,Smith</wprt:JobOriginatingUserName>
   <wprt:KOctetsProcessed>512</wprt:KOctetsProcessed>
   <wprt:MediaSheetsCompleted>3</wprt:MediaSheetsCompleted>
   <wprt:NumberOfDocuments>2</wprt:NumberOfDocuments>
  </wprt:JobSummary>
  <wprt:JobSummary>
   <wprt:JobId>2</wprt:JobId>
   <wprt:JobState>Pending</wprt:JobState>
   <wprt:JobName>Sample Job 2</wprt:JobName>
   <wprt:JobOriginatingUserName>Joe,Smith</wprt:JobOriginatingUserName>
   <wprt:KOctetsProcessed>0</wprt:KOctetsProcessed>
   <wprt:MediaSheetsCompleted>0</wprt:MediaSheetsCompleted>
   <wprt:NumberOfDocuments>1</wprt:NumberOfDocuments>
  </wprt:JobSummary>
 </wprt:ActiveJobs>
</wprt:GetActiveJobsResponse>
```

INFORMATION PROCESSING FOR CONTROLLING A PRINTER

BACKGROUND OF THE INVENTION

1. Field of the Invention

The present invention relates to an information processing apparatus, which is connected to a printer via a network, for controlling the printer.

2. Description of the Related Art

Conventionally, a printing system comprises a color printer capable of a color output, a host computer for controlling the printer and generating print data, and a communication interface connecting the printer and the host computer. An operating system runs on the host computer and a variety of software runs on the operating system. When various documents that have been created using application software are printed, the application software, a printer driver and the operating system execute function call, etc., through a stipulated procedure. Data is exchanged and a printer command (inclusive of print data) is generated through this procedure. The printer driver transfers the generated printer command to the printer, whereby printing is carried out. The printer driver is equipped with a function for performing bidirectional communication with the printer using a communication function provided by the operating system, and for displaying printer status information on a display screen. This enhances user convenience.

In general, the printing system of an operating system has a print queue, spools print jobs from the application software temporarily and then processes the print jobs successively. Owing to the action of the print queue, the application software can be freed from the print processing without waiting for the completion of printing by the printer. The printing system quits printing when all of the spooled print jobs have been sent to the printer.

There are cases where a print job that has been spooled in a print queue is desired to be printed again after the printing of the job has ended. In such case, with an operating system such as Microsoft's Windows Vista (registered trademark), the print job can be left in the print queue by turning on a "Keep printed documents" setting.

Further, there are also printers in which, when printing is to be cancelled, this can be achieved by pressing a cancel key on the printer in addition to canceling the printing from the print queue. This also enhances user convenience (see the specification of Japanese Patent Laid-Open No. 2002-200825).

As for communication interfaces, the USB (Universal Serial Bus) is available and so is WSD (Web Services on Devices), which has come to be employed in Windows Vista (registered trademark) in recent years. Printing by WSD is event-based. For example, if a paper-jam error occurs in the printer, the host computer is notified of this fact by the event. When printing ends, a JobEndStateEvent is sent from the printer to the host computer so that the host computer is capable of ascertaining when printing ended. [See Implementing Web Services on Devices for printing and scanning (the website at microsoft.com in the subdirectory japan in the subdirectory whdc in the subdirectory connect in the subdirectory rally in the subdirectory wsdspecs.mpsx)].

In the case of event-based printing such as that using WSD, a port monitor, which is one type of device driver of the operating system, executes print-end processing in response to the JobEndStateEvent sent from the printer to the host computer.

However, there are instances where print-end processing by the port monitor and termination of printing by the printing system of the operating system are not executed in the correct order.

By way of example, in a case where the "Keep printed documents" setting printing is turned on using the user interface (UI) of the print queue and printing is cancelled by pressing the cancel button on the printer during WSD-based printing, a problem which arises is that the print job which is supposed to be left in the queue is deleted from the queue.

Because a print job end processing by the port monitor is occurred due to transmission of JobEndState Event from the printer to the host computer after the printing system of the operating system completes end processing of the print job. Therefore, by the print job end processing, the print job, which is left in the queue, is deleted by the port monitor.

SUMMARY OF THE INVENTION

In order to solve the above-mentioned problem, the present invention provides an information processing technique whereby print-end processing can be executed in the correct processing sequence in event-based printing.

According to the first aspect of the present invention, there is an information processing apparatus, which is connected to a printer via a network, for controlling the printer, comprising: a communication control unit adapted to control communication with the printer; a data transfer unit adapted to transmit a print job to the printer in accordance with control by the communication control unit; and a job management unit adapted to manage the print job; wherein the data transfer unit has a job-end processing unit adapted to execute job-end processing, which is for completing processing relating to the print job, upon receiving a job-end event from the printer; and the communication control unit has: a monitor unit adapted to monitor processing status of the data transfer unit; and a notification unit adapted to notify the job management unit of end of the print job after it has been determined, as a result of monitoring by the monitor unit, that the job-end processing has been completed.

According to the second aspect of the present invention, there is an information processing apparatus, which is connected to a printer via a network, for controlling the printer, comprising: a data transfer unit adapted to transmit a print job to the printer; and a job management unit adapted to manage the print job; wherein the data transfer unit has: a job-end processing unit adapted to execute job-end processing, which is for completing processing relating to the print job, upon receiving a job-end event from the printer; and a communication unit adapted to notify the job management unit of end of the print job after the job-end processing has been completed.

According to the third aspect of the present invention, there is a method of controlling an information processing apparatus, which is connected to a printer via a network, for controlling the printer, comprising: a communication control step of controlling communication with the printer; a data transfer unit step of transmitting a print job to the printer in accordance with control by the communication control step; and a job management step of managing the print job on a storage medium; wherein the data transfer step has a job-end processing step of executing job-end processing, which is for completing processing relating to the print job, upon receiving a job-end event from the printer; and the communication control step has: a monitor step of monitoring processing status of the data transfer step; and a notification step of notifying the job management step of end of the print job after it has been determined, as a result of monitoring by the monitor step, that the job-end processing has been completed.

According to the fourth aspect of the present invention, there is a method of controlling an information processing apparatus, which is connected to a printer via a network, for controlling the printer, comprising: a data transfer step of transmitting a print job to the printer; and a job management step of managing the print job on a storage medium; wherein the data transfer step has: a job-end processing step of executing job-end processing, which is for completing processing relating to the print job, upon receiving a job-end event from the printer; and a communication step of notifying the job management step of end of the print job after the job-end processing has been completed.

According to the fifth aspect of the present invention, there is a program, which has been stored on a storage medium, for causing a computer to execute control of an information processing apparatus, which is connected to a printer via a network, for controlling the printer, the computer causing the computer to function as: a communication control unit adapted to control communication with the printer; a data transfer unit adapted to transmit a print job to the printer in accordance with control by the communication control unit; and a job management unit adapted to manage the print job; wherein the data transfer unit has a job-end processing unit adapted to execute job-end processing, which is for completing processing relating to the print job, upon receiving a job-end event from the printer; and the communication control unit has: a monitor unit adapted to monitor processing status of the data transfer unit; and a notification unit adapted to notify the job management unit of end of the print job after it has been determined, as a result of monitoring by the monitor unit, that the job-end processing has been completed.

According to the sixth aspect of the present invention, there is a program, which has been stored on a storage medium, for causing a computer to execute control of an information processing apparatus, which is connected to a printer via a network, for controlling the printer, the computer causing the computer to function as: a data transfer unit adapted to transmit a print job to the printer; and a job management unit adapted to manage the print job; wherein the data transfer unit has: a job-end processing unit adapted to execute job-end processing, which is for completing processing relating to the print job, upon receiving a job-end event from the printer; and a communication unit adapted to notify the job management unit of end of the print job after the job-end processing has been completed.

Further features of the present invention will become apparent from the following description of exemplary embodiments with reference to the attached drawings.

BRIEF DESCRIPTION OF THE DRAWINGS

FIG. 7 is a diagram useful in describing JobEndStateEvent according to the first embodiment of the present invention;

FIG. 8 is a diagram useful in describing JobEndStateEvent according to the first embodiment of the present invention;

FIG. 9 is a flowchart illustrating end processing executed by the port monitor 305 when JobEndStateEvent has been received according to the first embodiment of the present invention;

FIG. 10 is a diagram useful in describing job information acquired by a GetActiveJobs operation according to the first embodiment of the present invention;

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<First Embodiment>

Figure 1:
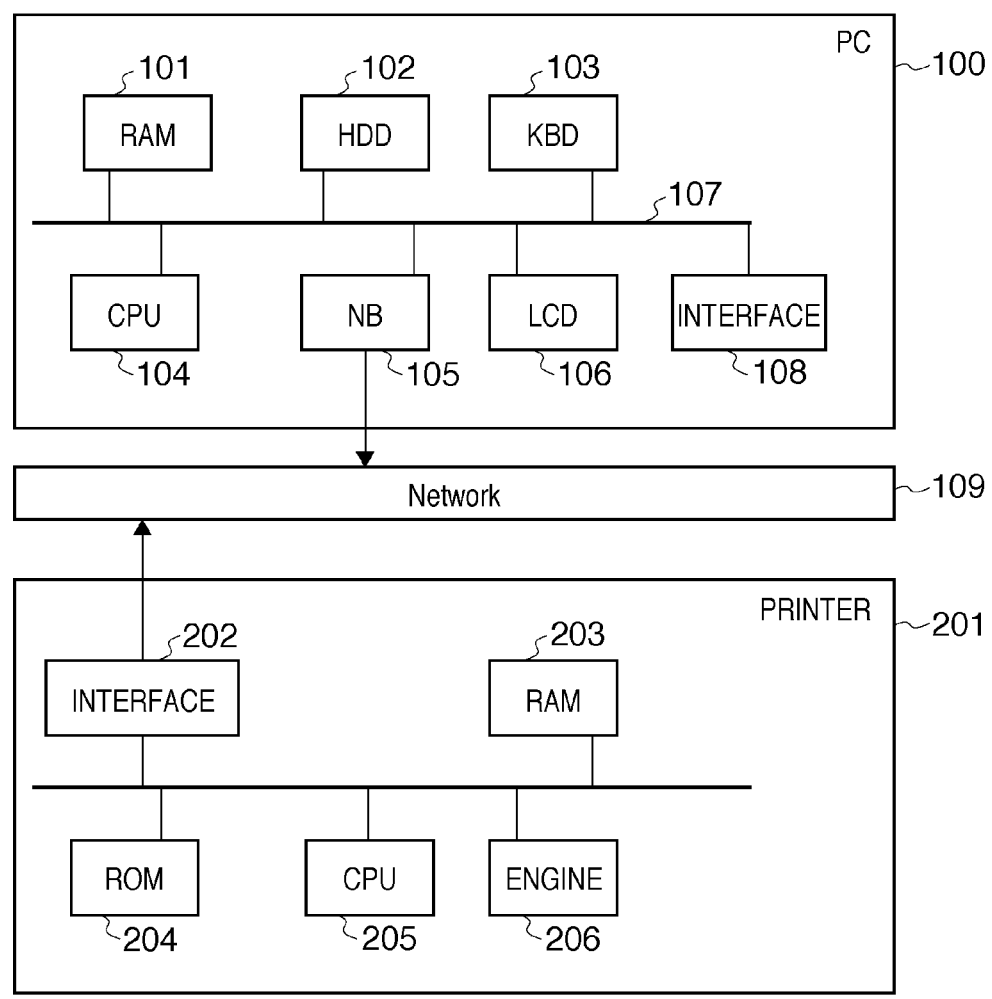
FIG. 1 is a block diagram illustrating the configurations of a computer and a printing apparatus according to a first embodiment of the present invention.

FIG. 1 is a block diagram illustrating the configurations of a computer and a printing apparatus according to a first embodiment of the present invention.

As shown in FIG. 1, an information processing apparatus 100 is constituted by an ordinary personal computer. By way of example, Microsoft's Windows Vista (registered trademark) has been installed in the information processing apparatus 100 as the operating system. The information processing apparatus 100 is controlled by a CPU 104, which is a control unit for controlling computations.

The CPU 104 uses a random-access memory (RAM) 101 as a temporary storage unit and controls the information processing apparatus 100 in accordance with a program loaded in the RAM 101 from a hard-disk drive (HDD) 102. A keyboard (KBD) 103, which is an example of an input unit, is used for data input or for commanding operation. A display (LCD) 106, which is an example of a display unit, is used to display data and status information. A network board (NB) 105, which is an example of a communication control unit, communicates via a network and is connected to a network 109. An interface (I/F) 108 controls a connection to a peripheral device.

A printer 201 has an interface (I/F) 202, a RAM 203, a ROM 204, a CPU 205 and an engine 206. The I/F 202 is connected to a network 109. Various programs such as a control program have been stored in the ROM 204. The CPU 205 controls various structural elements of the printer 201 in accordance with a control program that has been stored in the ROM 204. The RAM 203 is used as a main memory and work memory of the CPU 205 and has a buffer for temporarily storing received data. The engine 206 prints based upon data stored in the RAM 203. The engine of the printer 201 serving as the peripheral device in the first embodiment will be described taking ink-jet printing as an example. However, the invention is not limited to such printing and, by way of example, an electrophotographic, thermal transfer or other type of engine (a unit for printing on a medium) is applicable.

Figure 2:
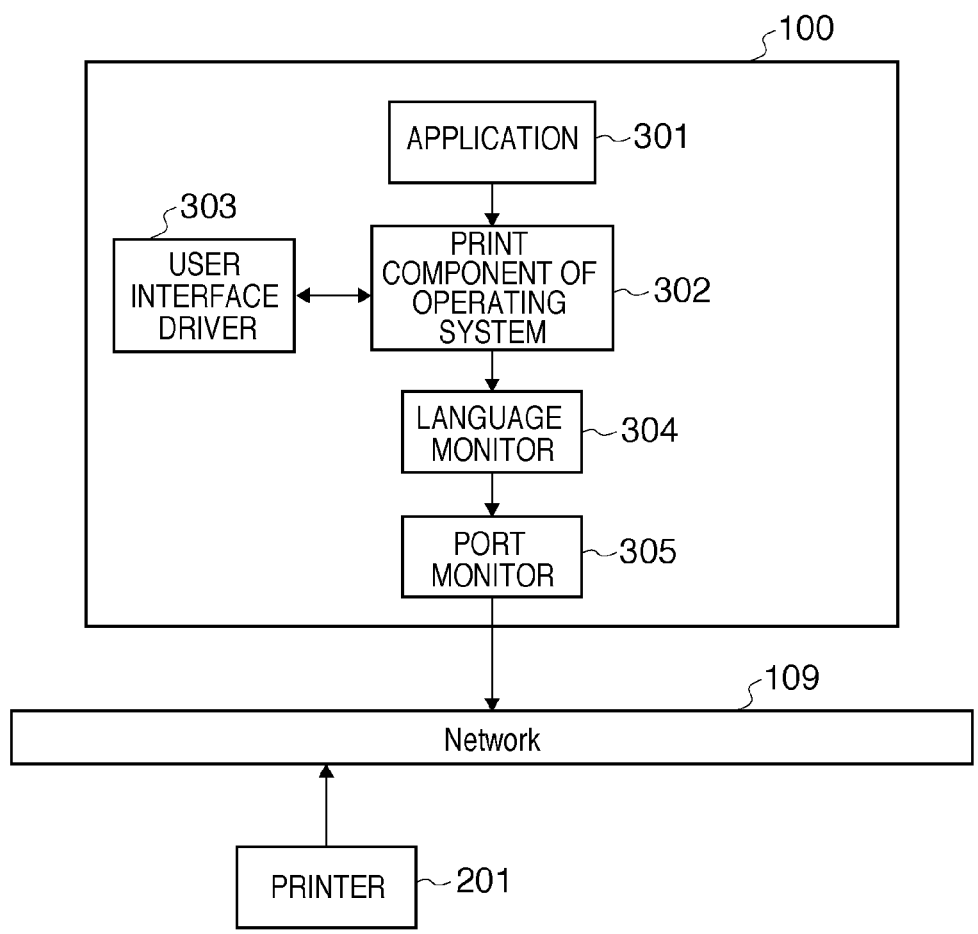
FIG. 2 is a block diagram illustrating a printing system applicable to an information processing apparatus shown in FIG. 1 according to the first embodiment of the present invention.

FIG. 2 is a block diagram illustrating a printing system applicable to an information processing apparatus shown in FIG. 1 according to the first embodiment of the present invention.

Any application 301 having a print processing function is installed in the information processing apparatus 100 besides the above-mentioned operating system. In the form of the apparatus considered here, the printer 201 is connected to the information processing apparatus 100 via the network 109. The application 301 is capable of configuring print setting information for the printer 201 via a print component 302 of the operating system. The print setting information is information necessary for printing, such as the type, paper size and paper-feed port, of paper on which pages generated by the application 301 are to be printed in the printer 201.

A user interface driver 303 has an interface capable of configuring various print settings and also notifies the application 301, via the print component 302, of a list of options capable of being set in various print settings information.

Rendering data for which printing has been requested by the application 301 is delivered to a language monitor 304 as a print job (inclusive of print data) via the print component 302. The language monitor 304 outputs the print job to a port monitor 305. The port monitor 305 transmits the delivered print job to the printer 201. In the first embodiment, a WSD-MON, which is a port monitor for WSD printing, is assumed as the port monitor 305. However, this does not impose any limitation and a variety of port monitors can be applied.

The language monitor 304 performs bidirectional communication with the printer 201 and functions as a communication control unit for transferring a print job to the printer 201 while acquiring printer status information. Further, the port monitor 305 functions as a data transfer unit for transmitting a print job from the language monitor 304 to the printer 201. Furthermore, the print component 302 functions as a job management unit (which corresponds to a spooler 401, described later) for managing a print job.

The port monitor 305 of the first embodiment further functions as a job-end processing unit which, in response to receipt of a job-end event from the printer 201, executes job-end processing for completing processing related to the job to be processed. The language monitor 304 further functions as a monitor unit for monitoring processing status (whether or not a job-end event has been received, and whether or not job-end processing has been completed) of the port monitor 305. The language monitor 304 further functions as a notification unit for notifying the print component 302, which functions as the job management unit, of the end of a print job after the completion of job-end processing.

Figure 3:
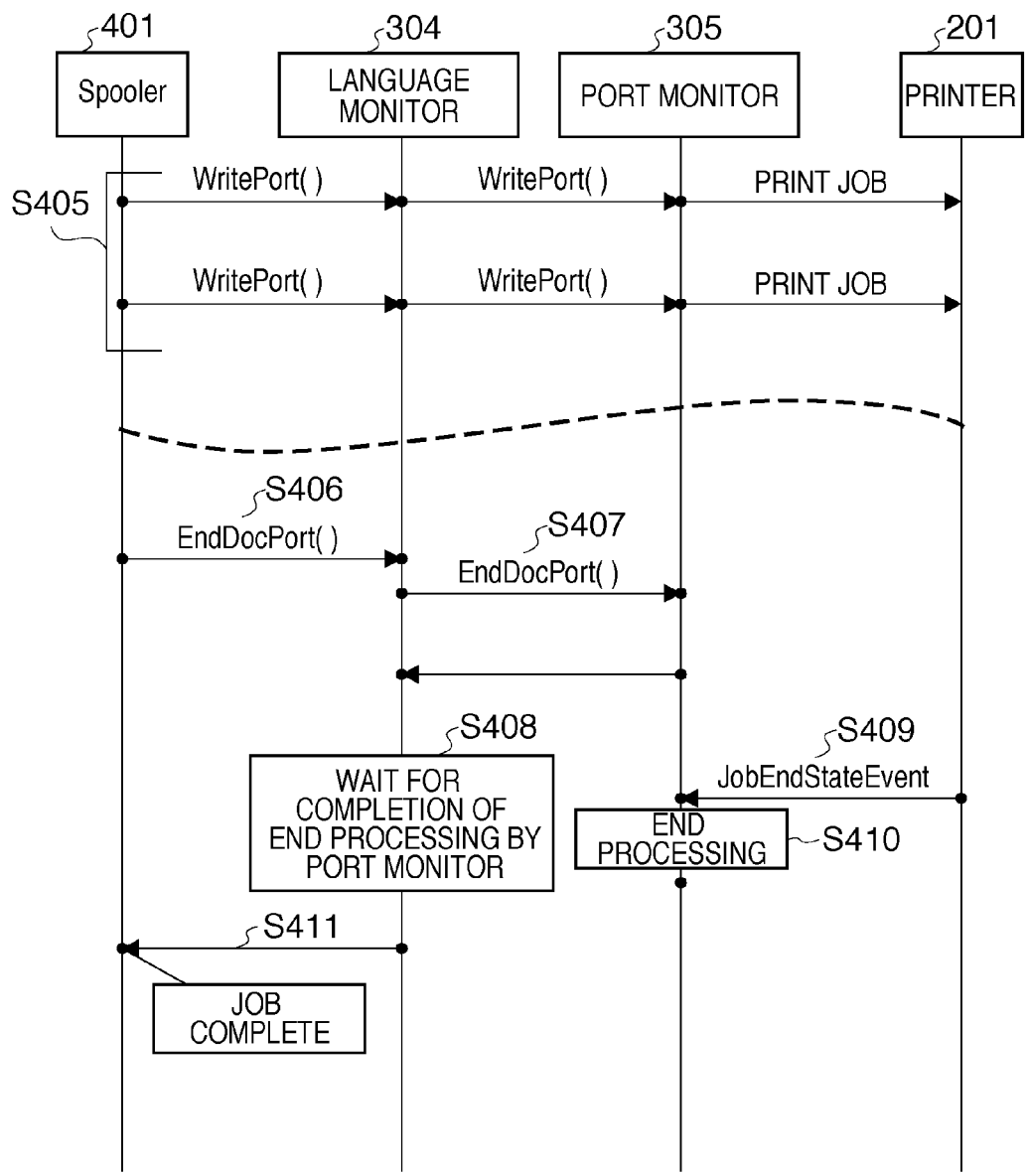
FIG. 3 is a diagram illustrating print-end processing in WSD printing in the printing system according to the first embodiment of the present invention.

FIG. 3 is a diagram illustrating print-end processing in WSD printing in the printing system according to the first embodiment of the present invention.

The spooler 401 is part of the print component 302. At step S405, the spooler 401 calls an export function WritePort( ) of the language monitor 304 and transmits a print job. The language monitor 304 transmits the received print job to the port monitor 305 by calling and using the export function WritePort( ) of the port monitor 305. The port monitor 305 transmits the received print job to the printer 201. This processing is repeated until an entire print job has been transmitted.

If an entire print job is finished being transmitted, then the spooler 401 calls an export function EndDocPort( ) of the language monitor 304 at step S406. The language monitor 304 executes the required end processing, such as the freeing of reserved memory and, at step S407, calls the export function EndDocPort( ) of the port monitor 305.

At step S408, after EndDocPort( ) of port monitor 305 has returned, the language monitor 304 waits until end processing of the port monitor 305 has been completed.

Meanwhile, at step S409, JobEndStateEvent is transmitted from the printer 201 to the port monitor 305 as status information indicating end of printing by the printer 201. At step S410, the port monitor 305, which has received JobEndStateEvent, executes end processing.

In the first embodiment, it is assumed that the port monitor 305 receives JobEndStateEvent. However, it may be so arranged that the print component 302 receives this event and instructs the port monitor 305 of completion of end processing.

When end processing of the port monitor 305 is completed, the language monitor 304 returns EndDocPort( ) to the spooler 401 at step S411 and printing by the print system is completed.

Figure 4:
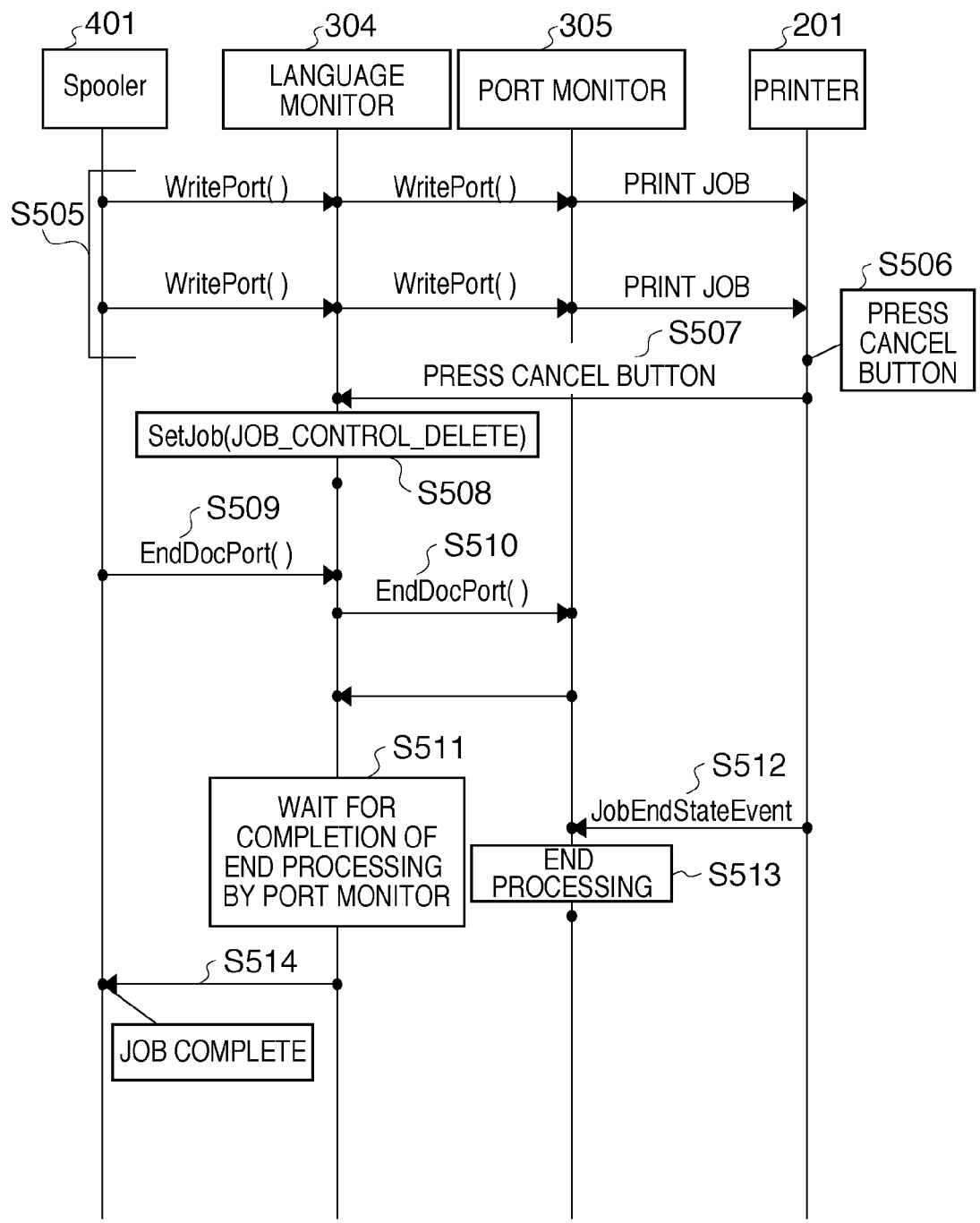
FIG. 4 is a diagram illustrating operation in a case where a cancel button on a printer is pressed and printing cancelled during WSD-based printing in the printing system according to the first embodiment of the present invention.

FIG. 4 is a diagram illustrating operation in a case where a cancel button on the printer is pressed and printing cancelled during WSD-based printing in the printing system according to the first embodiment of the present invention.

At step S505, the spooler 401 calls the export function WritePort( ) of the language monitor 304 and transmits a print job. The language monitor 304 transmits the received print job to the port monitor 305 by calling and using the export function WritePort( ) of the port monitor 305. The port monitor 305 transmits the received print job to the printer 201. This processing is repeated until an entire print job has been transmitted.

If the cancel button on the printer 201 is pressed at step S506, the printer 201 notifies the language monitor 304 of information indicative of pressing of the cancel button at step S507. This notification may be notification from the printer 201 to the language monitor 304 or may be implemented by a method in which the language monitor 304 queries the printer 201 periodically.

At step S508, upon receiving the notification indicating that the cancel button has been pressed, the language monitor 304 sets a parameter JOB_CONTROL_DELETE in order to stop transmission of the print job by the spooler 401. The language monitor 304 then calls SetJob( ) which is the Windows (registered trademark) API. When SetJob( ) are called with the JOB_CONTROL_DELETE parameter, the spooler 401 stops the transmission of the print job and, at step S509, calls the export function EndDocPort( ) of the language monitor 304.

The language monitor 304 executes the required end processing, such as the freeing of reserved memory and stop of printing and, at step S510, calls the export function EndDocPort( ) of the port monitor 305. At step S511, after EndDocPort( ) of port monitor 305 has been returned, the language monitor 304 waits until end processing of the port monitor 305 has been completed.

Meanwhile, at step S512, JobEndStateEvent indicating end of printing by the printer 201 is transmitted from the printer 201 to the port monitor 305. At step S513, the port monitor 305, which has received JobEndStateEvent, executes end processing.

When end processing of port monitor 305 is completed, the language monitor 304 returns EndDocPort( ) to the spooler 401 and at step S514 and processing for canceling printing is completed.

Figure 5:
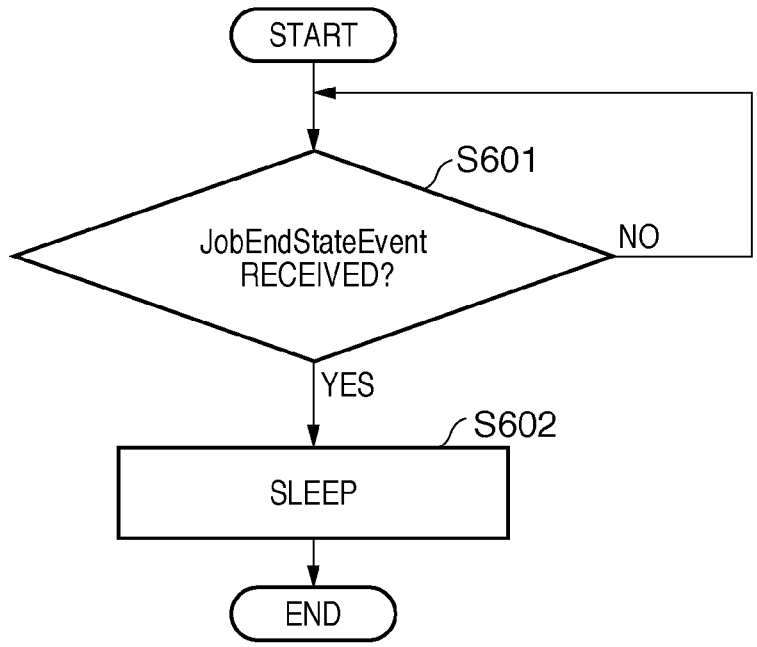
FIG. 5 is a flowchart illustrating operation in which a language monitor 304 monitors a port monitor 305 according to the first embodiment of the present invention.

FIG. 5 is a flowchart illustrating operation in which the language monitor 304 monitors the port monitor 305 according to the first embodiment of the present invention.

It should be noted that the operation in which the port monitor 305 is monitored (the operation for ascertaining completion of end processing by the port monitor 305) corresponds to the processing of steps S408 in FIG. 3 and S511 in FIG. 4.

At step S601 in FIG. 5, the language monitor 304 monitors the port monitor 305 and determines whether the port monitor 305 has received JobEndStateEvent from the printer 201. If the result of such monitoring is that the port monitor 305 has not received JobEndStateEvent from the printer 201 ("NO" at step S601), then the language monitor 304 stands by until the port monitor 305 receives JobEndStateEvent from the printer 201.

On the other hand, if the result of monitoring is that the port monitor 305 has received JobEndStateEvent from the printer 201 ("YES" at step S601), then the language monitor 304 sleeps for a fixed period of time and then terminates processing. In other words, by sleeping a fixed period of time following receipt of the job-end event (JobEndStateEvent) from the printer 201, the language monitor 304 renders a decision that the end processing in the port monitor 305 has been completed.

It should be noted that the fixed period of time is a length of time sufficiently longer than the time that elapses from start of execution of end processing by the port monitor 305 to completion of end processing. As a result of the language monitor 304 sleeping for the fixed period time in this way, it returns EndDocPort( ) to the spooler 401 following the moment at which the end processing by the port monitor 305 is positively completed. In other words, after the completion of end processing by the port monitor 305, the trigger of which is the job-end event (JobEndStateEvent), the language monitor 304 notifies the printing system of the operating system of the end of the job.

The flowchart of FIG. 5 is that of processing in a case where the language monitor 304 is capable of determining whether or not the port monitor 305 has received JobEndStateEvent. Depending upon the specifications of the system, there are cases where the language monitor 304 cannot determine whether the port monitor 305 has received JobEndStateEvent. In such cases the processing indicated by the flowchart of FIG. 6, for example, may be executed to thereby so arrange it that the language monitor 304 can determine whether the port monitor 305 has received JobEndStateEvent.

Figure 6:
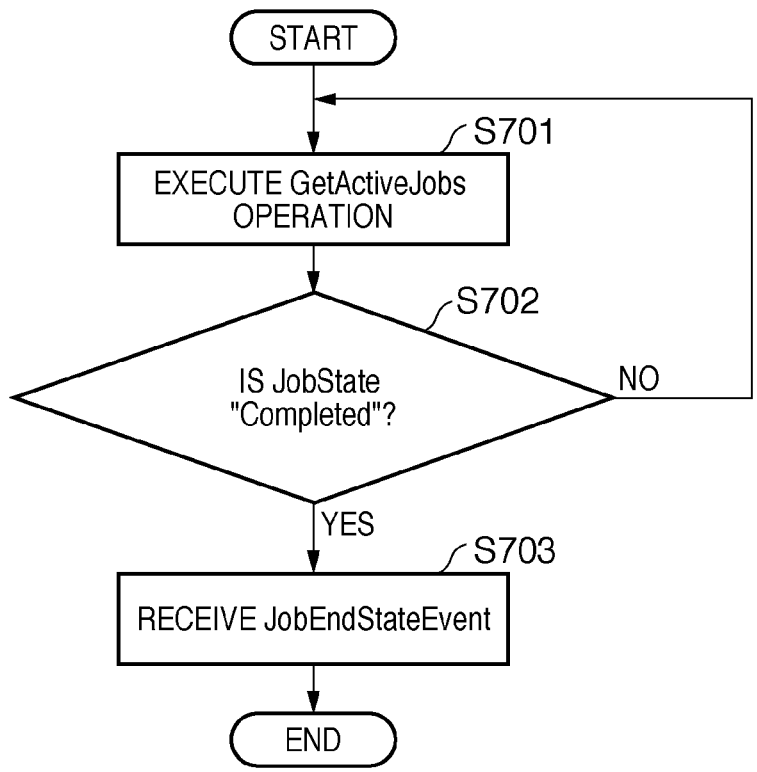
FIG. 6 is a flowchart illustrating alternative processing in a case where the language monitor 304 cannot determine whether JobEndStateEvent has been received according to the first embodiment of the present invention.

FIG. 6 is a flowchart illustrating alternative processing in a case where the language monitor 304 cannot determine whether JobEndStateEvent has been received according to the first embodiment of the present invention.

It should be noted that the processing of this flowchart corresponds to alternative processing for the processing at step S601 of FIG. 5.

At step S701, the language monitor 304 executes a GetActiveJobs operation, which is one type of WSD command, with respect to the printer 201. At step S702, the language monitor 304 determines whether JobState, which is status information acquired from the printer 201 by the GetActiveJobs operation, is indicative of completed.

If JobState does not indicate completed ("NO" at step S702), then control returns to step S701 and the language monitor 304 executes the GetActiveJobs operation again. On the other hand, if JobState does indicate completed ("YES" at step S702), then the language monitor 304 determines that the JobEndStateEvent has been received at step S703 and quits processing.

FIGS. 7 and 8 are diagrams useful in describing JobEndStateEvent according to the first embodiment of the present invention.

JobEndStateEvent, which is an event that the printer 201 transmits to the information processing apparatus 100 when printing of a print job ends, represents the final status of the print job. JobEndStateEvent is described in the XML format.

In FIG. 7, the value of a JobCompletedState element (701) is "Completed", from which it can be understood that the print job has ended normally.

In FIG. 8, the value of a JobCompletedState element (801) is "Canceled", and the value of a JobStateReason element (802) is JobCanceledAtDevice. From these it can be understood that the print job was cancelled by pressing the cancel button on the printer. The other elements of JobEndStateEvent are not described here as they have little bearing upon the first embodiment.

FIG. 9 is a flowchart illustrating end processing executed by the port monitor 305 when JobEndStateEvent has been received according to the first embodiment of the present invention.

It should be noted that this end processing corresponds to step S513 in FIG. 4.

At step S1001, the port monitor 305 checks the value of the JobCompletedState element of JobEndStateEvent and determines whether this value is "Canceled".

If the value of the JobCompletedState element is not "Canceled" ("NO" at step S1001), control proceeds to step S1003. On the other hand, if the value of the JobCompletedState element is "Canceled" ("YES" at step S1001), then port monitor 305 sets the JOB_CONTROL_DELETE parameter at step S1002. The port monitor 305 calls SetJob( ).

The port monitor 305 executes other necessary processing at step S1003 and then quits. The content of this necessary processing has little bearing upon the first embodiment and is not described here.

FIG. 10 is a diagram useful in describing job information acquired by a GetActiveJobs operation according to the first embodiment of the present invention.

Job information acquired as one item of status information is described in the XML format, and the job information contains job-related summary information. A JobState element (1001) represents the status of the current job. If the value of the JobState element is "Completed", this represents the fact that the job has ended. Although various values other than this have been defined, these have little bearing upon this embodiment and are not described here.

In accordance with the first embodiment, as described above, the printing system of an operating system is notified of the end of a job after the completion of end processing by a port monitor the trigger of which is a job-end event. As a result, print-end processing can be executed in the correct processing sequence in event-based printing.

<Second Embodiment>

Figure 11:
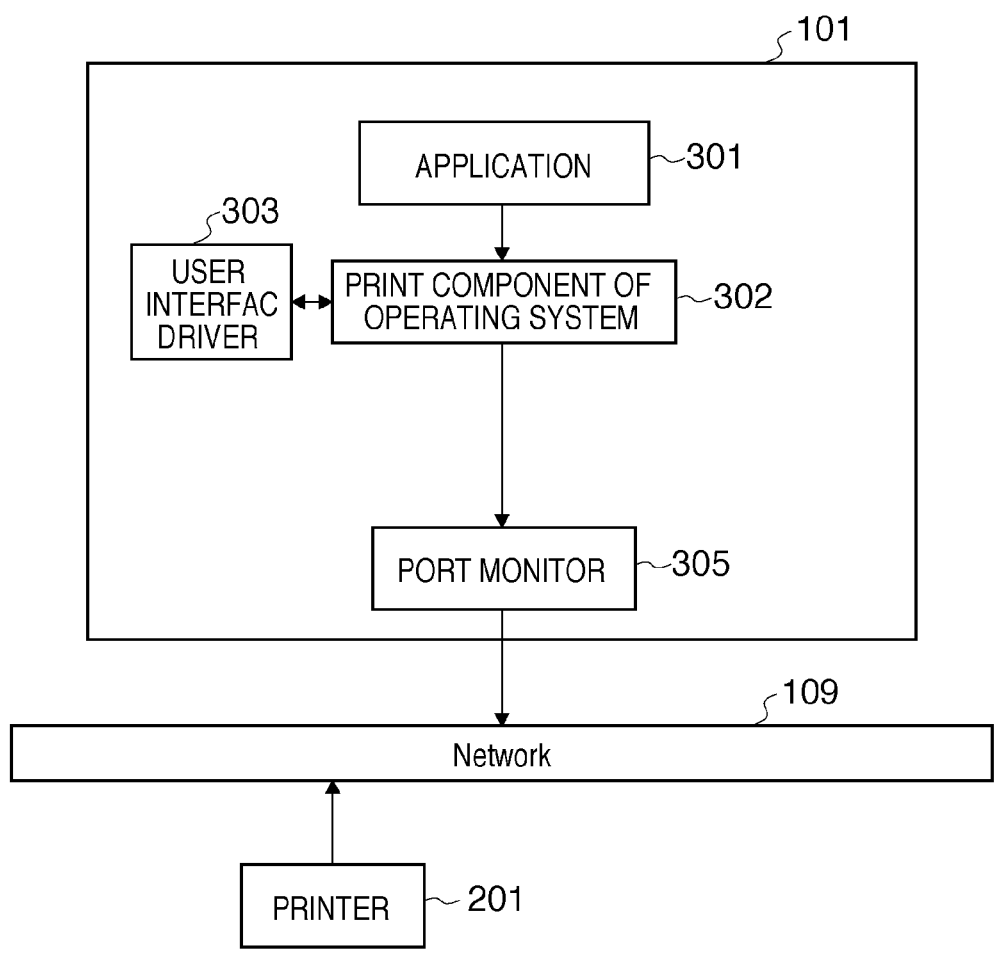
FIG. 11 is a block diagram illustrating a printing system applicable to the information processing apparatus of FIG. 1 according to a second embodiment of the present invention.

A second embodiment will be described with regard to an arrangement in which the language monitor 304 is deleted from the arrangements of FIGS. 1 and 2, particularly FIG. 2, of the first embodiment, as illustrated in FIG. 11.

It should be noted that in the case of the arrangement of FIG. 11 according to the second embodiment, the port monitor 305 functions as a job-end processing unit for executing job-end processing the trigger of which is receipt of a job-end event from the printer 201. The port monitor 305 further functions as a notification unit for giving notification of end of a print job to the print component 302, which functions as a job processing unit, after the completion of job-end processing.

Figure 12:
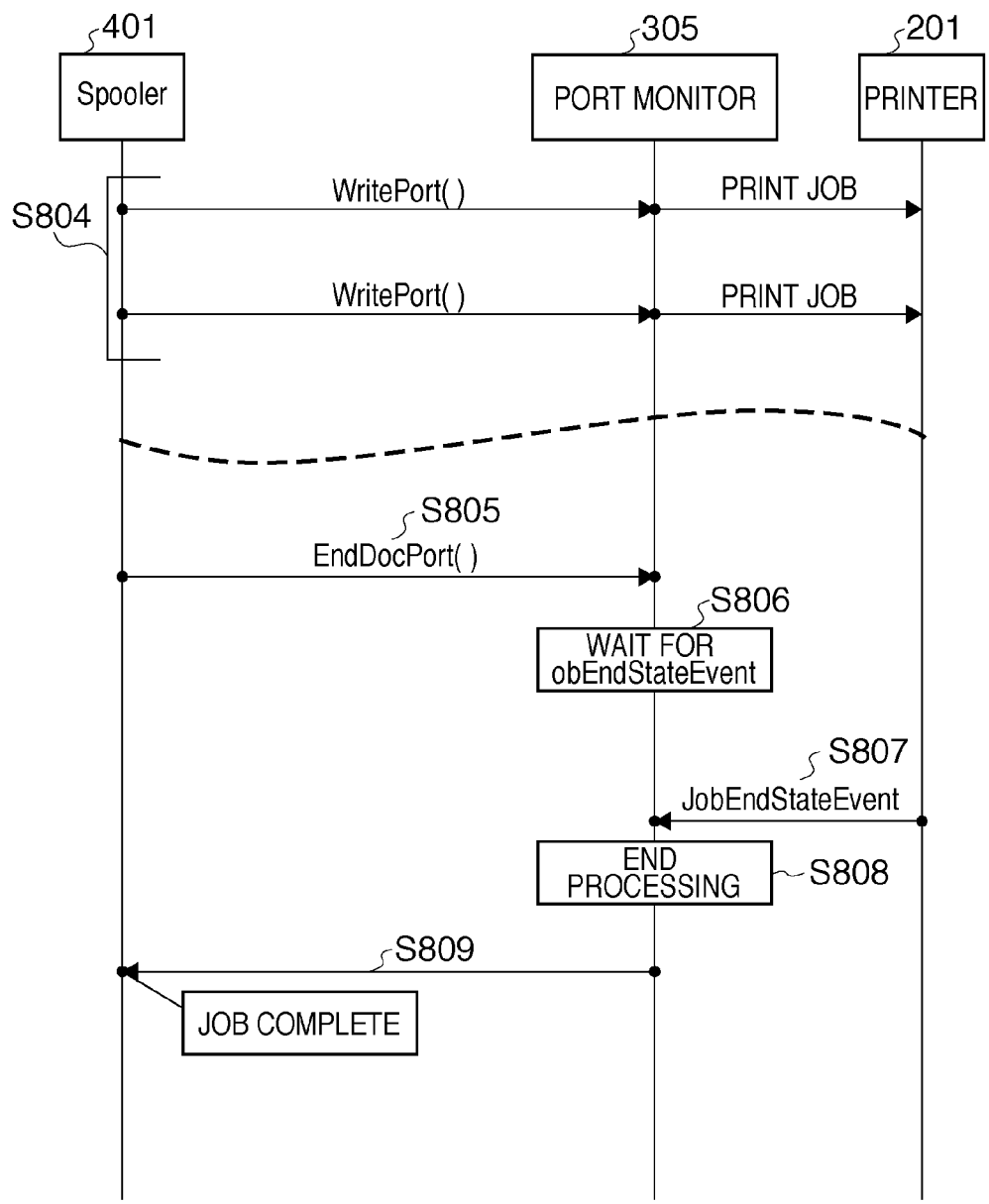
FIG. 12 is a diagram illustrating print-end processing in WSD printing in a printing system according to the second embodiment of the present invention.

FIG. 12 is a diagram illustrating print-end processing in WSD printing in a printing system according to the second embodiment of the present invention.

At step S804, the spooler 401 calls an export function WritePort( ) of the port monitor 305 and transmits a print job. The port monitor 305 transmits the received print job to the printer 201. This processing is repeated until an entire print job has been transmitted.

If an entire print job is finished being transmitted, then the spooler 401 calls an export function EndDocPort( ) of the port monitor 305 at step S805. At step S806, the port monitor 305 waits for JobEndStateEvent to be transmitted from the printer 201. When JobEndStateEvent is transmitted at step S807, the port monitor 305 executes the end processing of FIG. 9 at step S808. If end processing is completed, the port monitor 305 returns EndDocPort( ) to the spooler 401 at step S809 and printing by the printing system is completed.

In accordance with the second embodiment, as described above, effects similar to those of the first embodiment can be obtained even in a case where the language monitor 304 does not exist.

It should be noted that in the present invention, processing equivalent to that of the first and second embodiments can also be implemented by a computer program. In such case the components that constituted FIGS. 1 and 2 may be implemented by functions or by subroutines executed by a CPU. Further, implementation is possible by storing the computer program on a computer-readable storage medium such as a CD-ROM, loading the storage medium in a reading device (a CD-ROM drive, etc.) possessed by the computer, and then copying the program to or storing it in the system. Accordingly, it should be evident that such a computer-readable storage medium also falls within the scope of the present invention.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-047020, filed Feb. 27, 2009, which is hereby incorporated by reference herein in its entirety.

What is claimed is:

1. An information processing apparatus comprising:
a first reception unit configured to receive a notification indicating cancel of a print job from a printer;
a call unit configured to call a job function for stopping transmission of the print job by a spooler;
a second reception unit configured to receive a call of an end function indicating completion of transmission of the print job from the spooler if the job function is called;
an acquisition unit configured to acquire status information from the printer; and
a return unit configured to wait for a fixed period of time if the status information indicates completion of the print job, and to return the end function,
wherein if the status information does not indicate completion of the print job, said return unit does not return the end function and said acquisition unit acquires the status information again from the printer, and
wherein said fixed period of time is longer than a length of time that elapses from a start of a job-end processing of a port monitor to a completion of the job-end processing in response to receiving a job-end event of the print job from the printer.

2. The apparatus according to claim 1, wherein said status information includes statuses of a plurality of print jobs.

3. An information processing method comprising:
a first reception step of receiving a notification indicating cancel of a print job from a printer;
a call step of calling a job function for stopping transmission of the print job by a spooler;
a second reception step of receiving a call of an end function indicating completion of transmission of the print job from the spooler if the job function is called;
an acquisition step of acquiring status information from the printer; and
a return step of waiting for a fixed period of time if the status information indicates completion of the print job, and returning the end function,
wherein if the status information does not indicate completion of the print job, the return step does not return the end function and the acquisition step acquires the status information again from the printer, and
wherein said fixed period of time is longer than a length of time that elapses from a start of a job-end processing of a port monitor to a completion of the job-end processing in response to receiving a job-end event of the print job from the printer.

4. The method according to claim 3, wherein said status information includes statuses of a plurality of print jobs.

5. A non-transitory computer-readable storage medium storing a computer-executable program which, when executed by a computer, performs the steps of:
a first reception step of receiving a notification indicating cancel of a print job from a printer;
a call step of calling a job function for stopping transmission of the print job by a spooler;
a second reception step of receiving a call of an end function indicating completion of transmission of the print job from the spooler if the job function is called;
an acquisition step of acquiring status information from the printer; and
a return step of waiting for a fixed period of time if the status information indicates completion of the print job, and returning the end function,
wherein if the status information does not indicate completion of the print job, the return step does not return the end function and the acquisition step acquires the status information again from the printer, and
wherein said fixed period of time is longer than a length of time that elapses from a start of a job-end processing of a port monitor to a completion of the job-end processing in response to receiving a job-end event of the print job from the printer.

6. The non-transitory computer-readable storage medium according to claim 5, wherein said status information includes statuses of a plurality of print jobs.

* * * * *